United States Patent [19]

Markusch et al.

[11] Patent Number: 5,558,917
[45] Date of Patent: Sep. 24, 1996

[54] POLYURETHANE CARPET BACKING PROCESS BASED ON POLYMERIC MDI QUASI-PREPOLYMERS

[75] Inventors: Peter H. Markusch, McMurray, Pa.; James W. Rosthauser, Glendale, W. Va.

[73] Assignee: Bayer Corporation, Pittsburgh, Pa.

[21] Appl. No.: 438,454

[22] Filed: May 10, 1995

[51] Int. Cl.$^6$ .................................................. C08G 18/70
[52] U.S. Cl. .................... 428/95; 252/182.22; 528/67; 427/244; 427/389.9; 427/373; 521/160
[58] Field of Search .................. 252/182.22; 528/67; 427/244, 389.9, 358, 373; 428/95; 521/160

[56] References Cited

U.S. PATENT DOCUMENTS

| | | | |
|---|---|---|---|
| 3,362,979 | 1/1968 | Bentley et al. | 521/182.2 |
| 4,132,817 | 1/1979 | Tillotson | 427/244 |
| 4,189,543 | 2/1980 | Doorakian et al. | 521/128 |
| 4,278,482 | 7/1981 | Poteet et al. | 156/78 |
| 4,296,159 | 10/1981 | Jenkines et al. | 428/95 |
| 4,397,978 | 8/1983 | McKinney et al. | 524/409 |
| 4,435,459 | 3/1984 | McKinney et al. | 428/95 |
| 4,515,846 | 5/1985 | McKinney et al. | 428/95 |
| 4,525,405 | 6/1985 | McKinney et al. | 428/95 |
| 4,611,044 | 9/1986 | Meyer et al. | 528/56 |
| 4,657,790 | 4/1987 | Wing et al. | 427/374.1 |
| 4,696,849 | 9/1987 | Mobley et al. | 428/95 |
| 4,853,054 | 8/1989 | Turner et al. | 156/78 |
| 4,853,280 | 8/1989 | Poteet | 428/286 |
| 4,913,958 | 4/1990 | Skaggs et al. | 428/318.6 |
| 5,102,714 | 4/1992 | Mobley et al. | 428/95 |
| 5,104,693 | 4/1992 | Jenkines | 427/244 |
| 5,164,423 | 11/1992 | DeGenova et al. | 521/159 |
| 5,200,435 | 4/1993 | DeGenova et al. | 521/159 |
| 5,227,409 | 7/1993 | Mobley et al. | 521/167 |
| 5,240,635 | 8/1993 | DeGenova et al. | 252/182.21 |

*Primary Examiner*—Rachel Johnson
*Attorney, Agent, or Firm*—Joseph C. Gil; N. Denise Brown

[57] ABSTRACT

This invention relates to a novel polyisocyanate based on polymethylene poly(phenylisocyanate), to a process for the production of a polyurethane backing on a substrate using this novel polyisocyanate to produce the polyurethane backing, and to the polyurethane backed substrate produced by this process. In particular, this novel polyisocyanate has a functionality of less than about 2.4, an isocyanate group content of 25 to 30%, and a urethane content of from about 2 to 6%, and comprises comprising polymethylene poly(phenylisocyanate), from about 5 to 25% of 4,4'-methylene bis(phenyloisocyanate), and from about 20 to 50% of 2,2'- and 2,4'-methylene bis(phenyl-isocyanate). This polyisocyanate can be reacted with a polyol mixture to produce the polyurethane backing on a substrate.

24 Claims, No Drawings

POLYURETHANE CARPET BACKING PROCESS BASED ON POLYMERIC MDI QUASI-PREPOLYMERS

BACKGROUND Of THE INVENTION

The present invention relates to a novel isocyanate and to the use of this polyisocyanate in a process for the production of a polyurethane backing on a substrate. The formed polyurethane backed substrate is also considered part of the present invention. The polyisocyanates of this invention have a functionality of less than about 2.4, an isocyanate group content of 25 to 30%, and a urethane group content of from about 2 to 6% and comprises polymethylene poly(phenylisocyanate), from about 5 to 25% of 4,4'-methylene bis(phenylisocyanate), and from about 20 to 50% of 2,2'- and 2,4'-methylene bis(phenylisocyanate).

Various methods for the production of polyurethane cushion backing on substrates, particularly carpets, are well known and described in, for example, U.S. Pat. Nos. 4,132,817 and 4,278,482. These patents also describe different apparatus for the processes described therein.

Several patents disclose the use of general polyurethane formulations in combination with specific additives, including, for example, catalysts (U.S. Pat. Nos. 4,189,543, 4,515,846, and 4,611,044), fire suppressants (U.S. Pat. Nos. 4,397,978 and 4,435,459) and fillers (U.S. Pat. Nos. 4,296,159 and 4,525,405). There are also patents relating to the use of general polyurethane formulations in specific processes (U.S. Pat. Nos. 4,657,790 and 4,913,958), or in conjunction with specific types of textiles (U.S. Pat. No. 4,853,280).

There are also numerous patents relating to specific formulations based upon various isocyanates and specific polyol blends. For example, U.S. Pat. No. 4,696,849 discloses isocyanates with a polyol containing at least 30% primary hydroxyl groups; U.S. Pat. No. 4,853,054 discloses isocyanates having an average functionality of about 1.9 to 2.4 with a polyol having an EO content of from about 15 to 30% by weight.

U.S. Pat. Nos. 5,102,714 and 5,227,409 relate to isocyanates having an average functionality of about 2.2 or less with a polyol having an average functionality of 2.2 or less, and equivalent weight of at least 500 and containing from 10 to 70 mole percent of monoalcohol.

U.S. Pat. Nos. 4,296,159, 4,696,849, and 5,104,693 all describe polyurethane compositions which are suitable for the production of polyurethane backed substrates, particularly carpets. U.S. Pat. No. 4,296,159 discloses a polyurethane comprising a high molecular weight polyether polyol, a low molecular weight polyol, and organic polyisocyanate or polyisothiocyanate, and an inorganic filler. The isocyanate used in the examples are either isocyanate prepolymers based on toluene diisocyanate, or a modified diphenylmethane diisocyanate. TDI monomer is less desirable from an industrial hygiene standpoint.

The polyurethane composition disclosed in U.S. Pat. No. 4,696,849 that is suitable for carpet backing comprises a specific high equivalent weight polyol composition, a low equivalent weight compound having 2 active hydrogen atoms, a polyisocyanate, and a catalyst. Toluene diisocyanates, 2,4'- and 4,4'-diphenylmethanediisocyanates, and the isocyanate-terminated prepolymers thereof are said to be suitable isocyanates. However, the isocyanates may only contain minor amounts of the corresponding polymeric derivatives as the average functionality of the reactive components (i.e. all the active hydrogen containing components and isocyanates) must range from 1.97 to 2.03.

U.S. Pat. No. 5,104,693 discloses polyurethane compositions which are suitable for carpet backing comprising an isocyanate-reactive material having an average equivalent weight of 1000 to 5000, a blowing agent, and a polyisocyanate wherein at least 30% by weight of the polyisocyanate is a methylene bis(phenylisocyanate) soft segment prepolymer having an NCO content of about 10 to 30% by weight. This soft segment prepolymer has an average functionality of about 1.9 to 2.5, and is prepared by reacting MDI with an organic polymer having an equivalent weight of from about 500 to 5000, preferably from 1000 to 3000.

U.S. Pat. Nos. 5,164,423, 5,200,435, and 5,240,635 all describe the use of polyisocyanate blends for preparing flexible polyurethane foams. They disclose polyurethane flexible foam compositions comprising an active hydrogen containing compound, a carbon dioxide blowing agent, and a blend of a polymethylene poly(phenylisocyanate) and a methylene diphenyldiisocyanate prepolymer wherein the methylene diphenyldiisocyanate prepolymer is prepared in a formulation containing an active hydrogen containing compound which has an equivalent weight of about 30 to 600. These compositions use reduced amounts of chlorofluorocarbon blowing agents and have improved flowability characteristics compared to state-of-the-art formulations for use as cold cure molded foams, but may harden prematurely when processed in conventional carpet backing formulations.

The present invention has several advantages. These include an isocyanate containing no TDI monomer, which means the isocyanate is environmentally safer and easier to handle. Also, the reacting mixture has a desirable longer work life (referred to as "puddle time" in the carpet industry), during which it can be spread evenly on the substrate at about room temperature, while the reacting mixture has a sufficiently fast hardening time in the curing oven. It also produces a polyurethane with good flexibility. This particular combination of processing and properties is important in the carpet backing industry.

DESCRIPTION OF THE INVENTION

The present invention relates to a novel polyisocyanate, to a process for the production of a polyurethane backing on a substrate using this novel polyisocyanate, and finally to the polyurethane backed substrate produced by this process using this novel polyisocyanate. The polyisocyanates of this invention have a functionality of less than about 2.4, an isocyanate group content of 25 to 30%, and a urethane group content of from about 2 to 6%, and comprises polymethylene poly(phenylisocyanate), from about 5 to 25% of 4,4'-methylene bis(phenylisocyanate), and from about 20 to 50% of 2,2'- and 2,4'-methylene bis(phenylisocyanate).

These isocyanates generally have a viscosity of less than 500 mPa.s at 25° C. These isocyanates can be prepared by several ways as set forth herein. It is preferred that the functionality of these polyisocyanates range from about 1.8 to less than about 2.4, preferably from about 2 to less than about 2.4. The functionality of the isocyanate mixture is dictated by the relative amounts of methylene bis(phenylisocyanate) monomers and by the relative amounts and average functionalities of not only polymethylene poly(phenylisocyanate) but also of the urethane-containing species.

The urethane group content as used herein is defined as:

$$\% \text{ urethane} = \frac{59 \times (\text{OH equivalents}) \times 100}{\text{total weight}}$$

The present invention also relates to a process of producing a polyurethane backing on a substrate. This process comprises the steps of
  a) mixing an isocyanate and a polyol mixture to form a reaction mixture,
  b) applying the reaction mixture to the substrate, and
  c) curing the reaction mixture to form the polyurethane backing, wherein the isocyanate of step a)is a polyisocyanate having a functionality of less than about 2.4, an isocyanate group content of 25 to 30%, and a urethane group content of from about 2 to 6%, and comprises polymethylene poly(phenylisocyanate), from about 5 to 25% of 4,4'-methylene bis(phenylisocyanate), and from about 20 to 50% of 2,2'-and 2,4'-methylene bis(phenylisocyanate).

In the process of producing a polyurethane backing on a substrate, the quantities of the isocyanate and the polyol are such that the isocyanate index ranges from 90 to 180, preferably from 90 to 150, and most preferably from 100 to 130.

In commercial processes used to prepare methylene bis(phenylisocyanate), mixtures of the aniline/formaldehyde condensation products are phosgenated and then the monomeric two ring adducts are at least partially removed from the polymethylene poly(phenylisocyanate) mixture, most commonly by distillation. By varying the processing conditions, the ratio of aniline to formaldehyde, and the level and type of acid catalyst used for the condensation, mixtures of the various two ring isomers, i.e. , the 2,2'-, 2,4'-, and 4,4'-methylene bis(phenylamine), and the various positional isomers of the higher ring polyamine oligomers can be controlled. Thus, the phosgenated mixture can be tailored to be enriched in the relative amounts of monomeric two ring diisocyanates compared to higher ring polyisocyanates. In this manner, it is also possible to obtain mixtures that contain a relatively high amount of the less reactive ortho-substituted two ring and higher ring polyisocyanates. Mixtures of the 4,4'-, 2,4'-, and 2,2'- methylene bis(phenylisocyanate) monomers that are enriched in the 2,4'- and 2,2'-isomer can also be separated from these phosgenated mixtures by distillation. Alternatively, mixtures of the two ring diisocyanates and higher ring polyisocyanates can be produced directly having desirable viscosity, isomer ratio, and reactivity characteristics. By higher ring polyisocyanates, it is meant three-ring or higher products derived by the phosgenation of aniline-formaldehyde condensation products. These are also commonly known as polymeric MDI, and may be referred to as derivatives of MDI.

It is possible to prepare the isocyanates of the present invention, for example, by mixing polymethylene poly(phenylisocyanate) with additional monomeric methylene bis(phenylisocyanate), followed by the addition of a mixture containing at least one low molecular weight organic compound having an average functionality of from 1.0 to 3.0, preferably 1.5 to 2.5, most preferably from 1.8 to 2.2, and being selected from the group consisting of monoalcohols, diols, and triols. Tripropylene glycol, dipropylene glycol, and mixtures thereof are preferred low molecular weight compounds to be used in the preparation of the isocyanate mixture. Alternately, one can make the isocyanate directly from a polymethylene poly(phenylisocyanate) that already contains a relatively high level of monomer (e.g., about 50 to 80%) due to its method of manufacture. In cases where the average functionality of polymeric MDI is already >2.4, it is preferred to use mixtures of monoalcohols and diols/triols to reduce the average functionality of the product.

Suitable low molecular weight organic compounds to be used in preparing the isocyanate as described hereinabove include those compounds having a molecular weight of less than 500, and an average functionality of from 1.0 to 3.0, preferably 1.5 to 2.5, and most preferably 1.8 to 2.2. These compounds are carefully selected from the group consisting of monoalcohols, diols, triols, and mixtures thereof so that the resulting modified polymeric isocyanates are homogeneous liquids at room temperature. Some examples of suitable compounds include, for example, glycols such as, for example, ethylene glycol, propylene glycol, 1,3-propane diol, 1,4-butanediol, 1,6-hexamethylene glycol, dipropylene glycol, tripropylene glycol, diethylene glycol, triethylene glycol, tetraethylene glycol, tetrapropylene glycol, heptapropylene glycol, neopentyl glycol, 2,2,4-trimethyl-1,5-pentanediol, etc. Suitable monoalcohols include compounds such as, for example, methanol, ethanol, 1-propanol, 1-butanol, 1-pentanol, 2-ethylhexanol, dodecanol, etc. These also include compounds such as, for example, cyclohexanedimethanol and the various bisphenols. It is most preferred to use a technical mixture of tri-/dipropylene glycol.

The low molecular weight organic compounds are incorporated into the polyisocyanate in the form of urethane-containing adducts. These urethane-containing adducts are present in the isocyanate in an amount necessary to assure compatibility of the reacting mixture of the polyols and isocyanate in the process according to the present invention, such that the urethane content of the polyisocyanate is from about 2 to 6%.

In another embodiment, the isocyanate comprises a blend of
  1) from 25 to 75% by weight, preferably about 50% by weight, based on the total weight of said isocyanate component, of a polymethylene poly(phenylisocyanate) mixture having an average functionality of from about 2.2 to 2.8, containing from about 12 to 25% by weight of 2,2'- and 2,4'-methylene bis(phenylisocyanate) and about 30 to 50% by weight of 4,4'-methylene bis(phenylisocyanate), and about 25 to 55% by weight of higher ring polyisocyanate compounds, and having an isocyanate group content of 30 to 33%, and
  2) from 75 to 25% by weight, preferably about 50% by weight, based on the total weight of said isocyanate component, of a polyisocyanate adduct prepared by the reaction of a mixture of 2,2'-, 2,4'-, and 4,4'-methylene bis(phenyl-isocyanate) wherein the amount of 4,4'-isomer is less than about 60%, preferably between about 35 and 55%, most preferably about 40 to 50%, with at least one low molecular weight organic compound having average functionality of from 1.0 to 3.0, preferably 1.5 to 2.5, and most preferably from 1.8 to 2.2, and being selected from the group consisting of monoalcohols, diols, and triols, said adduct having an isocyanate group content of 20 to 25%. It is particularly preferred that this polyisocyanate adduct be prepared by the reaction of this mixture of 2,2'-, 2,4'-,and 4,4'-methylene bis(phenylisocyanate)isomers with tripropylene glycol, optionally in admixture with dipropylene glycol.

As set forth hereinabove, the present invention also requires a polyol mixture. This polyol mixture comprises at least one high molecular weight polyol and at least one low molecular weight chain extender, and should have an average functionality of less than 3. This polyol mixture to be reacted with the isocyanate in the preparation of the polyurethane backing may additionally comprise flame retardants, fillers, blowing agents, surfactants, catalysts, colorants, antistatic agents, reinforcing fibers, antioxidants, preservatives, water scavengers, and other additives known to be useful in polyurethane chemistry. Among these, fillers, surfactants, and catalysts are preferred.

Suitable high molecular weight polyols for use in the polyol mixture of the present invention include those organic compounds having molecular weights of from 500 to 5000 and containing from 1 to 12 isocyanate reactive hydrogen atoms. These compounds include, for example, polyethers, polyesters, polythioethers, polyacetals, polycarbonates, polymer filled polyols, and amine terminated polyethers of the type known for the production of polyurethanes. Preferred compounds include the polyethers containing from 1.5 to 4.0, preferably 2.0 to 3.0 isocyanate-reactive groups, and having molecular weights of from 500 to 5000, preferably 800 to 3000.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Suitable examples of high molecular weight polyesters include, for example, the reaction products of polyhydric, preferably dihydric alcohols (optionally, in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be substituted, for example, by halogen atoms, and/or unsaturated. The polycarboxylic acids and polyols used to prepare the polyesters are known and described for example in U.S. Pat. Nos. 4,940,750, 4,098,731 and 3,726,952, herein incorporated by reference in their entirety. The following are disclosed as suitable examples: succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrahydroisophthalic anhydride, hexahydroisophthalic anhydride, endomethylene tetrahydrophthalic anhydride, glutaric anhydride, maleic anhydride, maleic acid, fumaric acid, dimeric fatty acids such as, for example, oleic acid, and dimethyl terephthalate and mixed terephthalates. Suitable dihydric alcohols include ethylene glycol, 1,3- and 1,2-propylene glycol; 1,4-, 1,3- and 2,3- butylene glycol; 1,6-hexamethylene glycol; 1,8-octanediol; neopentyl glycol; cyclohexanedimethanol or 1,4-bis-(hydroxymethyl)-cyclohexane; 2-methyl-1,3-propanediol; 2,2,4-trimethyl-1,3-pentanediol; diethylene glycol; dipropylene glycol; triethylene glycol; tripropylene glycol; dibutylene glycol; polyethylene glycol; polypropylene glycol; and polybutylene glycol. The polyesters may also contain a portion of carboxyl end groups. Polyesters of lactones, for example, ε-caprolactone or hydroxycarboxylic acids, for example, ω-hydroxycaproic acid, may also be used.

Suitable polythioethers, polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hoechtlen, Carl Hanser Verlag, Munich, 1966, pages 45–71.

In one embodiment of the present invention, it is also possible to use polymer filled polyols in the polyol mixture. These are polyhydroxyl compounds containing high molecular weight polyadducts and polycondensates or polymers in finely dispersed or dissolved form. Such polymer filled polyols may be obtained by polyaddition reactions (for example, reactions between polyisocyanates and amino-functional compounds), and polycondensation reactions (for example, between formaldehyde and phenols and/or amines) in situ in the above mentioned polyols.

In one preferred embodiment of the present invention, the polyol is a dispersion of a polyurea and/or polyhydrazodicarbonamide in an organic compound containing at least about two hydroxyl groups. These dispersions are known in the art, are commercially available, and have been described, e.g., in U.S. Pat. Nos. 3,325,421; 4,042,537; 4,089,835; 4,293,470; 4,296,213, 4,374,209, 4,847,320 and 5,342,855, the disclosures of which are hereby incorporated by reference. In general, the dispersions useful herein are produced by reacting monofunctional, bifunctional, or higher functional isocyanates with (a) polyamines containing primary or secondary amino groups and/or (b) hydrazines and/or hydrazides, in the presence of an organic compound which contains at least about two hydroxyl groups. As is known and is described in the above-mentioned U.S. patents, such dispersions can be produced having a wide range of solids contents. In general, the solids contents range from 1 to as high as about 40 percent. In general, it is preferred that such dispersions contain high levels of primary hydroxyl groups.

Also preferred are the polymer polyols that are prepared by polymerizing one or more ethylenically unsaturated monomers, for example, styrene and acrylonitrile, in a relatively high molecular weight organic compound containing at least about two hydroxyl groups (U.S. Pat. Nos. 3,383,351; 3,304,273; 3,523,093; 3,110,695), which preferably are primary hydroxyl groups. These polymer polyols are known in the art, are commercially available, and have been described in, for example, U.S. Pat. Nos. 3,110,695; 3,304,273; 3,383,351; 3,523,093; 3,953,393; 4,233,425; 4,287,323; 4,431,715; 4,454,255; 4,458,038; 4,460,715; 4,524,157; 4,585,831; 4,647,624; 4,689,354; 4,690,956; 4,721,733; 4,837,246; 4,837,247; 5,010,187; 5,021,506; 5,114,619; 5,354,667; 5,364,906; 5,374,705; 5,358,984, and Re 33,291; the disclosures of which are herein incorporated by reference. Polyurethane backings having particularly low combustibility are obtained by using polyether polyols modified by graft polymerization with vinyl phosphonic acid esters and, optionally, (meth-)acrylonitrile, (meth- )acrylamide or OH-functional (meth-)acrylic acid esters (German Offenlegungsschriften Nos. 2,442,101; 2,644,922; and 2,646,141). Polyols into which carboxyl groups have been introduced by radical graft polymerization with unsaturated carboxylic acids and, optionally, other olefinically unsaturated monomers (German Offenlegungsschriften Nos. 2,714,291; 2,739,620; and 2,654,746) are particularly advantageous when used in combination with mineral fillers.

The polymer polyols noted above and useful herein are known and are commercially available from such companies as Arco, Bayer, BASF, and Dow. A partial list of some commercially available polymer polyols is included in U.S. Pat. No. 4,569,952.

Suitable low molecular weight chain extenders to be used in the polyol mixture include organic compounds having a molecular weight of less than 500, and an average functionality of from 1.0 to 3.0, preferably 1.5 to 2.5, and most preferably 1.8 to 2.2. These compounds are selected from the group consisting of monoalcohols, diols, triols, and mixtures thereof. Some examples of suitable compounds include, for example, glycols such as, for example, ethylene glycol, propylene glycol, 1,2- and 1,3-propane diol, 1,3-, 1,4- and 2,3-butanediol, 1,6-hexanediol, dipropylene glycol, tripropylene glycol, diethylene glycol (i.e. DEG), triethylene glycol (i.e. TEG), tetraethylene glycol, tetrapropylene glycol, heptapropylene glycol, 2-methyl-1,3-propanediol, 1,10-decanediol, neopentyl glycol, and 2,2,4-trimethylpentane-1,3-diol, etc. Suitable monoalcohols include compounds such as, for example, methanol, ethanol, 1-propanol, 2-propanol, n-butanol, 1-pentanol, 2-ethyl-1-hexanol, stearyl alcohol, and alkyl substituted phenols containing from 1 to 22 carbon atoms in the alkyl group such as, for example, nonylphenol. These also include compounds such as, for example, cyclohexanedimethanol and the various bisphenols. Preferred chain extenders include DEG, TEG, and mixtures thereof, and also symmetrical diols such as, for example, 1,4-butanediol and 1,6-hexanediol.

In addition to the above compounds, suitable chain extenders also include amino alcohols. Some examples of suitable alkanolamines include ethanolamine, diethanolamine, N-methyldiethanolamine, N-ethyl diethanolamine, triethanolamine, etc. For reasons of slower reactivity, compounds containing solely active hydrogen atoms based on hydroxyl groups and not on amine groups are preferred. The preferred alkanolamines are the N-substituted diethanolamines.

Suitable catalysts to be used in the present invention include, for example, tertiary amine compounds and organometallic catalysts. The preferred catalysts are heat-activated.

Some examples of suitable organometallic catalysts include, for example organometallic compounds of tin, lead, iron, bismuth, mercury, nickel, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di-(2-ethylhexyl)tin oxide, etc. Delayed action or heat-activated tin catalysts such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercaptoacetate), and di(isooctyl)tin bis(isooctylmercaptoacetate), all of which are commercially available from Witco Chemical Corp., are especially preferred. The use of a delayed action catalyst such as an iron pentanedione or a bismuth carboxylate, as described in U.S. Pat. No. 4,611,044, herein incorporated by reference, is also possible. The use of a delayed action catalyst such as nickel acetylacetonate, as described in, for example, U.S. Pat. Nos. 3,772,224 and 3,849,156, the disclosures of which are herein incorporated by reference, is preferred.

Suitable heat-activated catalysts for the present invention are amine salts. These catalysts include aliphatic and aromatic tertiary amines. Suitable heat-activated amine salts include compounds such as, for example, DABCO 8154 commercially available from Air Products, a formic acid blocked triethylene diamine, and other delayed action catalysts such as DABCO WT, also commercially available from Air Products; and Polycat SA-1 and Polycat SA-102 which are both acid-blocked versions of 1,8-diaza-bicyclo[5.4.0] undecene-7 (i.e. Polycat DBU) and commercially available from Air Products. Trialkyl amines and heterocyclic amines are also suitable for the present invention. Suitable compounds include, for example, trimethylamine; triethylamine; tripropylamine; tributylamine; dimethyl cyclohexylamine; dibutyl cyclohexylamine; dimethyl ethanolamine; triethanolamine; diethyl ethanolamine; ethyl diethanolamine; dimethyl isopropanolamine; triisopropanolamine; triethylenediamine, tetramethyl- 1,3-butanediamine; N,N,N',N'-tetramethylethylenediamine; N,N,N',N'-tetramethylhexanediamine-1,6; N,N,N',N',N"-pentamethyl diethylenetriamine; bis(2-dimethyl-aminoethoxy) methane; N,N,N'-trimethyl-N'-(2-hydroxyethyl ethylenediamine; N,N-dimethyl-N',N'-(2-hydroxyethyl)-ethylenediamine; tetramethylguanidine; N-methylpiperidine; N-ethylpiperidine; N-methylmorpholine; N-ethylmorpholine; 1,4-dimethylpiperidine; 1,2,4-trimethylpiperidine; N-(2-dimethylaminoethyl)-morpholine; 1-methyl-4-(2-dimethylamino-piperidine; 1,4-diazabicyclo-[2.2.2]octane; 2-methyl-1,4-diazabicyclo [2.2.2]-octane; quinuclidine; 1,5-diazabicyclo[5.4.0]-5-undecene; and 1,5-diazabicyclo-[4.3.0]-5-nonane.

Organometallic catalysts are usually used in amounts ranging from about 0.001 to about 10.0, preferably about 0.005 to 5.0 parts per 100 parts of isocyanate-reactive material. Tertiary amine (salt) catalysts are advantageously used in amounts ranging from about 0.01 to about 5, preferably about 0.1 to about 2 parts per 100 parts of isocyanate-reactive compounds. It is most preferred that the catalysts be used in quantities such that they comprise less than 2%, preferably less than 1% of the total composition.

It is usually desirable to include a filler in the reaction mixture, in order to reduce costs and improve some physical properties. Useful fillers include materials such as, for example, calcium carbonate, alumina trihydrate, titanium dioxide, iron oxide, barium sulfate, etc. In general, fillers are usually used in quantities of from about 20 to 300 parts per 100 parts of the polyol mixture.

It is also possible that the polyol mixture includes, for example, flame retardants, surfactants, colorants, antistatic agents, reinforcing fibers, antioxidants, preservatives, water scavengers, blowing agents, and the like.

The reaction mixtures of the present invention are usually foamed by mixing in gases. However, this can also be done using water, and other auxiliary blowing agents, including hydrocarbons, fluorocarbons, fluorohydrocarbons, chlorofluorocarbons, etc.

In the present invention, the term "blowing agent" is used rather broadly to include any compound which may be incorporated into the reaction mixture, as well as other materials which volatilize, decompose, react, or otherwise generate a gas under the conditions encountered in the formation of the polyurethane layer. Frothing is the preferred method of reducing density of the polyurethane, and the preferred blowing agent is air, nitrogen, argon, helium, or another gas that is inert to the reaction mixture. Air and nitrogen are most preferred gases. Alternatively, or in conjunction with the gas, low boiling organic compounds (including the halogenated and non-halogenated types), the so-called "azo" blowing agents, and the like can be used.

Water can also be used as a blowing agent in the practice of this invention. It not only generates carbon dioxide gas for foaming, but also reacts with polyisocyanates and functions as a chain extender contributing to the strength of the foam and its ability to retain its cellular structure. When water is used, it is preferably used in amounts from about 0.1 to about 10 weight percent, more preferably from about 0.5 to about 8 weight percent, and most preferably from about 1 to 5 weight percent, based on the total weight of the reactive polyol components.

It is preferred to use a surfactant in the reaction mixture of the present invention. Surfactants include block copolymers of ethylene oxide or mixtures of a major amount of ethylene oxide with a minor amount of propylene oxide and dimethylsiloxane. The more preferred surfactants are block copolymers containing 15 to about 40 weight percent polydimethylsiloxane, a polyether block containing at least about 60 weight percent oxyethylene units, and a molecular weight below 30,000 as described in U.S. Pat. No. 4,483,894, the disclosure of which is herein incorporated by reference. A sufficient amount of the surfactant is used to stabilize the cells of the foaming reaction mixture until curing occurs, and to produce an even-celled foam. In general, such surfactants are used in amounts ranging from 0.01 to about 2 parts per 100 parts by weight of the reactive polyol components.

In preparing polyurethane-backed substrates according to the invention, the individual components of the polyurethane-forming composition are mixed and applied as a layer of preferably uniform thickness onto one surface of the substrate. It is often preferred to premix all components except the isocyanate (and blowing agent when the system is frothed) to form a formulated "B-side". When water is used as a blowing agent, it is pre-mixed with the polyol component to form a formulated "B-side". This simplifies the metering and mixing of components at the time the polyurethane-forming composition is prepared. In preparing a frothed polyurethane backing, it is preferred to mix all components and then blend a gas into the mixture, using equipment such as an Oakes or Firestone foamer.

The isocyanates described hereinabove have been found to be particularly effective in producing a polyurethane backing for floorings and, especially, for carpets when used with the polyol mixture described hereinabove. Other possible applications include roofing membranes, sound dampening foams, foam shoe inlays, energy absorbing foams, carpet padding, etc.

Other suitable substrates for the polyurethane produced from the presently claimed process include, for example, jute, synthetic jute, nonwoven fibers, especially non-woven polypropylene fiber, treated or non-treated release papers. These substrates can be coated with the polyurethane backing in order to produce roofing membranes or polyurethane carpet padding, which is installed prior to cushion backed or non-backed carpet.

The following examples further illustrate details for the process of this invention. The invention, which is set forth in the foregoing disclosure, is not to be limited either in spirit or in scope by these examples. Those skilled in the art will readily understand that known variations of the conditions of the following procedures can be used. Unless otherwise noted, all temperatures are degrees celsius and all parts are parts by weight.

EXAMPLES 120 parts of a polyol mixture were used in each of the examples. The polyol mixture was prepared from 507 parts of a 4000 MW polyether diol prepared from propylene oxide and tipped with ethylene oxide such that about 90% of the hydroxyl groups are primary, 93 parts of a technical grade of diethylene glycol, and 3 parts of nickel acetylacetonate commercially available from OSI Specialties, Inc. of Danbury, Conn. as NIAX LC-5615. The amount of isocyanate was adjusted so that the ratio of isocyanate to isocyanate reactive groups remained constant at 1.05. In the examples, the common abbreviation "MDI" is used in place of methylene diphenyldiisocyanate or methylene bis(phenylisocyanate).

The reaction mixtures were prepared by mixing the isocyanate (40° C.) and the polyol mixture (40° C.) in glass jars (40° C.) for forty-five seconds using a mechanical stirrer with 1000 rpm agitation rate. The temperature rise of the reaction mixtures remaining in the glass jar were monitored over time. At the end of the stirring period, a portion (about 10 parts) of each mixture was poured onto a hot plate held at 100° C. Forty-five seconds after the stirring was completed, a second portion (about 10 parts) of each mixture was poured into a pan (40° C.) and placed into an oven held at 40° C. The gel point (defined as the time necessary for material to no longer flow back together within ten seconds after scratching through it with a wooden stick at the maintained temperature) was determined for the material at 400° C. and at 100° C.

Example 1

65.0 parts of Isocyanate A were used in this example.

Isocyanate A:

an isocyanate having an average isocyanate functionality of about 2.35, an isocyanate content of about 27.1%, contains about 17% monomeric 4,4'-MDI, about 33% monomeric 2,2'- and 2,4'-MDI isomers, and about 25% higher ring homologues of the MDI series and the remainder being the adducts of 2,4'- and 4,4'-MDI with tripropylene glycol such that the urethane group concentration of the mixture was about 4.2%. The viscosity of the mixture was about 310 mPa.s at room temperature. The mixture was prepared by mixing 50 parts of a 133 equivalent weight polymeric isocyanate mixture having an average functionality of about 2.7, a 4,4'-MDI isomer concentration of about 33%, and a 2,2'- and 2,4'-MDI isomer concentration of about 15% with 50 parts of a 182 equivalent weight prepolymer prepared by reacting a mixture of 45 parts 4,4'-MDI and 55 parts 2,2'-and 2,4'-MDI with a technical grade of tripropylene glycol.

The reaction mixture reached a peak temperature of 54° C. within 20 minutes. The gel point of the material in the 40° C. oven was about 130 minutes. The gel point of the material on the 100° C. hotplate was about 330 seconds.

Example 2: (Comparative Example)

The same general procedure was followed in this example as that described hereinabove, except that 64.1 parts of Isocyanate B were used.

Isocyanate B:

an isocyanate having an average isocyanate functionality of about 2.15, an isocyanate content of about 27.5%, containing about 48% monomeric 4,4'-MDI, about 10% monomeric 2,2'- and 2,4'-MDI isomers, about 18% higher ring homologues of the MDI series, and the remainder being the adduct of 4,4'-MDI with tripropylene glycol such that the urethane group concentration of the mixture was about 4.2%. The viscosity of the mixture was about 140 mPa.s at room temperature. The mixture was prepared by mixing 50 parts of a 130 equivalent weight polymeric isocyanate mixture having an average functionality of about 2.3, a 4,4'-MDI isomer concentration of about 45%, and a 2,2'- and 2,4'-MDI isomer concentration of about 19% with 50 parts of a 182 equivalent weight prepolymer prepared by reacting 4,4'-MDI with tripropylene glycol.

The reaction mixture reached a peak temperature of 100° C. within 8 minutes. The gel point of the material in the 40° C. oven was about 11 minutes. The gel point of the material on the 100° C. hotplate was about 150 seconds.

Example 3: (Comparative Example)

The same general procedure was followed in this example as that described hereinabove, except that 63.3 parts of Isocyanate C were used.

Isocyanate C:

an isocyanate having an average isocyanate functionality of about 2.10, an isocyanate content of about 27.9%, containing about 41% monomeric 4,4'-MDI, about 23% monomeric 2,2'- and 2,4'-MDI isomers, about 11% higher ring homologues of the MDI series, and the remainder being the adducts of 2,4'- and 4,4'-MDI with tripropylene glycol such that the urethane group concentration of the mixture was about 4.2%. The viscosity of the mixture was about 110 mPa.s at room temperature. The mixture was prepared by mixing 50 parts of a 128 equivalent weight polymeric isocyanate mixture having an average functionality of about 2.2, a 4,4'-MDI isomer concentration of about 55%, and a 2,2'- and 2,4'-MDI isomer concentration of about 23% with 27.5 parts of a 182 equivalent weight prepolymer prepared by reacting 4,4'-MDI with tripropylene glycol and 22.5 parts of a 180 equivalent weight prepolymer prepared by reacting a mixture of 45 parts of 4,4'-MDI and 55 parts 2,2'- and 2,4'-MDI with a technical grade of tripropylene glycol.

The reaction mixture reached a peak temperature of 109° C. within 7 minutes. The gel point of the material in the 40° C. oven was about 8 minutes. The gel point of the material on the 100° C. hotplate was about 170 seconds.

Example 4

The same general procedure was followed in this example as that described hereinabove, except that 67.9 parts of Isocyanate D were used.

Isocyanate D:

an isocyanate having an average isocyanate functionality of about 2.23, an isocyanate content of about 25.9%, containing about 11% monomeric 4,4'-MDI, about 38% monomeric 2,2'- and 2,4'-MDI isomers, about 18% higher ring homologues of the MDI series, and the remainder being the adducts of 2,4'- and 4,4'-MDI with tripropylene glycol such that the urethane group concentration of the mixture was about 5.6%. The viscosity of the mixture was about 430 mPa.s at room temperature. The mixture was prepared by mixing 33 parts of a 133 equivalent weight polymeric isocyanate mixture having an average functionality of about 2.7, a 4,4'-MDI isomer concentration of about 33%, and a 2,2'- and 2,4'-MDI isomer concentration of about 15% with 67 parts of a 182 equivalent weight prepolymer prepared by reacting a mixture of 45 parts 4,4'-MDI and 55 parts 2,2'-and 2,4'-MDI with a technical grade of tripropylene glycol.

The reaction mixture reached a peak temperature of 82° C. within 12 minutes. The gel point of the material in the 40° C. oven was about 115 minutes. The gel point of the material on the 100° C. hotplate was about 320 seconds.

The examples show that the positives of the reaction mixtures at processing temperatures are dramatically affected by the composition of the isocyanate. The curing times of the reaction mixtures at elevated temperatures are less affected. The examples illustrate not only the importance of the relative amounts of polymeric MDI to monomeric MDI, but also the importance of the composition of the monomeric portion. The specific isocyanate mixtures of the present invention thus give extended "puddle times" while sufficiently curing under about the same conditions as reaction mixtures containing state-of-the-art isocyanate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate composition having a functionality of less than about 2.4, an isocyanate group content of 25 to 30%, and a urethane group content of from about 2 to 6%, and comprising polymethylene poly(phenylisocyanate), from about 5 to 25% of 4,4'-methylene bis(phenylisocyanate), and from about 20 to 50% of 2,2'- and 2'-4'-methylene bis(phenylisocyanate).

2. The polyisocyanate composition of claim 1 wherein said polyisocyanate is prepared by a) mixing polymethylene poly(phenylisocyanate) with additional monomeric methylene bis(phenylisocyanate) to form i) an isocyanate mixture, then b) reacting said isocyanate mixture i) with ii) one or more organic compounds having a molecular weight of less than 500, an average functionality of from 1.0 to 3.0, and being selected from the group consisting of monoalcohols, diols, triols and mixtures thereof.

3. The polyisocyanate composition of claim 2 wherein said organic compound has an average functionality of from 1.5 to 2.5.

4. The polyisocyanate composition of claim 2 wherein said organic compound has an average functionality of from 1.8 to 2.2.

5. The polyisocyanate composition of claim 2 wherein said organic compound is selected from the group consisting of tripropylene glycol, dipropylene glycol and mixtures thereof.

6. The polyisocyanate composition of claim 1 wherein said polyisocyanate comprises a blend of
   1) 25 to 75% by weight, based on the total weight of said isocyanate component, of a polymethylene poly(phenylisocyanate) mixture having an average functionality of from about 2.2 to 2.8, an isocyanate group content of 30 to 33% by weight, and containing from 12 to 25% by weight of 2,2'- and 2,4'-methylene bis(phenylisocyanate) and about 30 to 50% by weight of 4,4'-methylene bis(phenylisocyanate), and about 25 to 55% by weight of higher ring polyisocyanate compounds, and 2) 75 to 25% by weight, based on the total weight of said isocyanate component, of a polyisocyanate adduct having an isocyanate group content of 20 to 25% by weight, and being prepared by reacting i) a mixture of 2,2'-, 2,4'-, and 4,4'-methylene bis(phenylisocyanate), wherein the amount of 4,4'-isomer is less than about 60%, with ii) one or more organic compounds having a molecular weight of less than 500, an average functionality of from 1.0 to 3.0, and being selected from the group consisting of mono-alcohols, diols, triols and mixtures thereof.

7. The polyisocyanate composition of claim 6 wherein said organic compound has an average functionality of from 1.5 to 2.5.

8. The polyisocyanate composition of claim 6 wherein said organic compound has an average functionality of from 1.8 to 2.2.

9. The polyisocyanate composition of claim 6 wherein said organic compound is selected from the group consisting of tripropylene glycol, dipropylene glycol and mixtures thereof.

10. The polyisocyanate composition of claim 6, wherein i) said mixture of 2,2'-, 2,4'- and 4,4'-methylene bis(phenylisocyanate) contains between 35 and 55% by weight of the 4,4'-isomer.

11. The polyisocyanate composition of claim 6, wherein i) said mixture of 2,2'-, 2,4'- and 4,4'-methylene bis(phenylisocyanate) contains between 40 and 50% by weight of the 4,4'-isomer.

12. In a process for the production of a polyurethane backing on a substrate comprising the steps of:

a) mixing a polyisocyanate and a polyol mixture to form a reaction mixture, b) applying said reaction mixture to said substrate, and c) curing said reaction mixture to form said polyurethane backing, the improvement wherein said polyisocyanate has a functionality of less than about 2,4, an isocyanate group content of 25–30%, and a urethane content of from about 2 to 6%, and comprises polymethylene poly(phenylisocyanate), from about 5 to 25% of 4,4'-methylene bis(phenylisocyanate), and from about 20 to 50% of 2'-2'and 2,4'-methylene bis(phenylisocyanate).

13. The process of claim 12 wherein said polyisocyanate is prepared by a) mixing polymethylene poly(phenylisocyanate) with additional monomeric methylene bis(phenylisocyanate) to form i) an isocyanate mixture then b) reacting said isocyanate mixture i) with ii) one or more organic compounds having a molecular weight of less than 500, an average functionality of from 1.0 to 3.0, and being selected from the group consisting of monoalcohols, diols, triols and mixtures thereof.

14. The process of claim 12 wherein said polyisocyanate comprises a blend of:

1) 25 to 75% by weight, based on the total weight of said isocyanate component, of a polymethylene poly(phenylisocyanate) mixture having an average functionality of from about 2.2 to 2.8, containing from 12 to 25% by weight of 2,2'- and 2,4'-methylene bis(phenylisocyanate) and about 30 to 50% by weight of 4,4'-methylene bis(phenylisocyanate), and about 25 to 55% by weight of higher ring polyisocyanate compounds, and having an isocyanate group content of 30 to 33% by weight, and 2) 75 to 25% by weight, based on the total weight of said isocyanate component, of a polyisocyanate adduct having an isocyanate group content of 20 to 25% by weight, and being prepared by reacting i) a mixture of 2,2'-, 2,4'-, and 4,4'-methylene bis(phenylisocyanate), wherein the amount of 4,4'- isomer is less than about 60%, with ii) one or more organic compounds having a molecular weight of less than 500, an average functionality of from 1.0 to 3.0, and being selected from the group consisting of monoalcohols, diols, triols and mixtures thereof.

15. The process of claim 13 wherein said organic compound has an average functionality of from 1.5 to 2.5.

16. The process of claim 13 wherein said organic compound has an average functionality of from 1.8 to 2.2.

17. The process of claim 13 wherein said organic compound is selected from the group consisting of tripropylene glycol, dipropylene glycol and mixtures thereof.

18. The process of claim 12 wherein said reaction mixture additionally comprises at least one filler.

19. The process of claim 18 wherein said filler is selected from the group consisting of calcium carbonate, alumina trihydrate and mixtures thereof.

20. The process of claim 14 wherein said organic compound has an average functionality of from 1.5 to 2.5.

21. The process of claim 14 wherein said organic compound has an average functionality of from 1.8 to 2.2.

22. The process of claim 14 wherein said organic compound is selected from the group consisting of tripropylene glycol, dipropylene glycol and mixtures thereof.

23. The process of claim 14 wherein said isocyanate comprises a blend of:

1) about 50% by weight, based on the total weight of said isocyanate component, of said polymethylene poly(phenylisocyanate) mixture, and 2) about 50% by weight, based on the total weight of said isocyanate component, of said polyisocyanate adduct.

24. The polyurethane backed substrate produced by the process of claim 12.

* * * * *